United States Patent [19]

Aso et al.

[11] Patent Number: 5,183,987
[45] Date of Patent: Feb. 2, 1993

[54] CUT-OUT PIECE REMOVING METHOD IN ELECTRIC DISCHARGE MACHINING AND AN APPARATUS THEREFOR

[75] Inventors: Toshiyuki Aso; Shinji Yoda, both of Yamanashi, Japan

[73] Assignee: Fanuc Ltd., Minamitsuru, Japan

[21] Appl. No.: 777,526

[22] PCT Filed: Apr. 5, 1991

[86] PCT No.: PCT/JP91/00455
§ 371 Date: Dec. 5, 1991
§ 102(e) Date: Dec. 5, 1991

[87] PCT Pub. No.: WO91/15324
PCT Pub. Date: Oct. 17, 1991

[30] Foreign Application Priority Data

Apr. 5, 1990 [JP] Japan .................................. 2-89039

[51] Int. Cl.$^5$ .................... B23H 7/02; B23H 11/00
[52] U.S. Cl. .................... 219/69.12; 269/13; 269/20
[58] Field of Search ............ 269/13, 14, 20; 219/69.12, 69.14, 69.17; 83/651.1

[56] References Cited

U.S. PATENT DOCUMENTS

| | | | |
|---|---|---|---|
| 4,354,796 | 10/1982 | Bergman | 269/20 |
| 4,745,253 | 5/1988 | Girardin | 219/69.12 |
| 4,752,665 | 6/1988 | del Santo | 219/69.12 |
| 4,820,894 | 4/1989 | Francois et al. | 219/69.12 |
| 4,996,406 | 2/1991 | Nakayama | 219/69.12 |

FOREIGN PATENT DOCUMENTS

| | | | |
|---|---|---|---|
| 60-259323 | 12/1985 | Japan | 219/69.14 |
| 61-109617 | 5/1986 | Japan . | |
| 61-214921 | 9/1986 | Japan . | |
| 62-218025 | 9/1987 | Japan | 219/69.12 |
| 63-174817 | 7/1988 | Japan . | |
| 64-71624 | 3/1989 | Japan | 219/69.14 |
| 2-71926 | 3/1990 | Japan . | |

*Primary Examiner*—Geoffrey S. Evans
*Attorney, Agent, or Firm*—Staas & Halsey

[57] ABSTRACT

A method and an apparatus for easily and reliably removing cut-out pieces cut out from a workpiece by wire-cut electric discharge machining, in which, upon completion of cutting a piece (41) out, a constraining assembly (63) mounted on the distal end of a piston (62) is brought close to the top surface of the piece under the control of a numerical control unit, and machining fluid is upwardly jetted from a lower nozzle (19) toward the bottom surface of the piece, to thereby hold the piece in the workpiece, with the piece kept away from the lower nozzle and prevented from being detached upwardly from the workpiece. While jetting the machining fluid, a worktable is horizontally moved to cause the cut-out piece to move in unison with the workpiece away from the lower nozzle in the horizontal direction. At a moved position where the machining fluid jet normally no longer acts on the bottom surface of the piece, the table movement is stopped and the machining fluid is downwardly jetted from auxiliary nozzles (70) toward the top surface of the piece, to thereby forcibly drop the piece off the workpiece.

7 Claims, 4 Drawing Sheets

CUT-OUT PIECE REMOVING METHOD IN ELECTRIC DISCHARGE MACHINING AND AN APPARATUS THEREFOR

TECHNICAL FIELD

The present invention relates to a method and an apparatus for removing pieces from a workpiece after they are cut out from the workpiece by wire-cut electric discharge machining.

BACKGROUND ART

In wire-cut electric discharge machining, products of various shapes are produced by moving a table mounted with a workpiece, while intermittently generating electric discharge between a wire traveling from an upper nozzle toward a lower nozzle and the workpiece located between these nozzles. In the case of cutting-out, from a single workpiece, a plurality of pieces each constituting a product or a core corresponding to a cavity portion of the product, the workpiece is moved to a cutting-out machining start position for the next piece each time the cutting-out machining for one of the pieces is completed. At this time, the cut-out piece and the lower nozzle may be rubbed against each other, resulting in damage to the cut-out piece or the lower nozzle, in particular, if the workpiece is moved under a condition that the cut-out piece is inclined in the workpiece due to its own weight. If the cut-out piece as a product incurs a frictional scratch, the product quality is deteriorated.

To obviate these inconveniences, it has been known to remove cut-out pieces from a workpiece by means of various methods each time one of the cut-out pieces is cut out from the workpiece. For instance, a workpiece is horizontally moved while a cut-out piece is held in the workpiece with the aid of a supporting plate extending between the bottom surface of the workpiece and the upper end surface of the lower nozzle, and the natural falling of the cut-out piece from the supporting plate and the workpiece is permitted at the end of the supporting plate at a location separated from the lower nozzle in the horizontal direction. This method is easy to implement, but if the top surface of the supporting plate is soiled or scratched, then the movement of the piece on the supporting plate and hence the movement of the workpiece may be prevented, possibly causing scratches on the piece or undue load onto a table driving mechanism which moves the workpiece.

Another method is known, wherein a piece which is not completely cut out of but left slightly linked to the workpiece is tapped off the workpiece with a hammer or the like. This method, however, is likely to easily cause a flaw on the piece. Further, if the hammer is made smaller so that it can remove even such a piece which is small in horizontal section, then it may fail to remove a piece having a larger horizontal section or a greater thickness.

Still another method is known, wherein a cut-out piece, which is drawn up out of a workpiece using a suction means, such as magnet, suction pad, etc. is moved, with the piece attached to the suction means, to a position horizontally away from the lower nozzle, and then the sucking action of the suction means is released so as to detach the cut-out piece at that position. Further, another method is known, wherein a cut-out piece held in a workpiece using a similar suction means is moved in unison with the workpiece to a position away from the lower nozzle, and then the suction of the suction means is released to permit the natural falling of the cut-out piece. However, an electromagnetic suction means such as magnet cannot be applied to cut-out pieces made of non-magnetic materials. In the case of using a suction pad or the like, the provision of a complicated piping is required to connect the suction pad or the like to a pressure reducing device. Also, a cut-out piece, which has a limited effective suction area because of its rugged top surface or other reasons, is likely to come off suction means during the movement. When a cut-out piece is removed from the workpiece by drawing it up, part of the main body of an electric discharge machine to which suction means is installed must be reinforced. When a cut-out piece is moved in unison with the workpiece, the suction means must be moved in synchronization with the movement of the workpiece, resulting in a complicated device configuration.

DISCLOSURE OF THE INVENTION

An object of the present invention is to provide a method and an apparatus for removing cut-out pieces, which make it possible to easily and reliably remove pieces cut out of a workpiece by wire-cut electric discharge machining, without damaging the cut-out pieces or the lower nozzle.

To achieve the above-mentioned object, according to one aspect of the present invention, there is provided a method for removing a cut-out piece in electric discharge machining in which a piece is cut out from a workpiece. The method of the present invention comprises the steps of: (a) upwardly jetting fluid toward a bottom surface of a piece cut out of a workpiece; and (b) horizontally moving the cut-out piece in unison with the workpiece while jetting the fluid. The cut-out piece is permitted to naturally drop off the workpiece when it reaches a horizontal moved position at which the jetted fluid no longer acts thereon.

Preferably, the method of the present invention further includes the step of downwardly jetting the fluid toward a top surface of the cut-out piece when the cut-out piece reaches the horizontal moved position at which the jetted fluid no longer acts thereon. Preferably, the method of the present invention is applied to an electric discharge machine having a nozzle for upwardly jetting machining fluid toward the workpiece, and a table for horizontally moving the workpiece. When a piece has been cut out of the workpiece, the jetting of the fluid in the step (a) is performed by means of the nozzle, and the movement of the cut-out piece in the step (b) is performed by means of the table.

According to another aspect of the present invention, there is provided a cut-out piece removing apparatus for use in a wire-cut electric discharge machine in which a piece is cut out from a workpiece. The apparatus of the present invention comprises fluid jetting means for upwardly jetting fluid toward a bottom surface of the piece cut out of the workpiece; drive means for horizontally moving the cut-out piece in unison with the workpiece; and control means for starting operations of the fluid jetting means and the drive means upon completion of cutting out of the piece from the workpiece.

Preferably, the cut-out piece removing apparatus, which is mounted on an electric discharge machine having a lower wire guide, further includes second fluid jetting means for downwardly jetting the fluid toward the top surface of the cut-out piece at a location horizontally away from the lower wire guide, under the control of the control means. Preferably, the cut-out piece removing apparatus further includes constraining means, having a constraining member which is movable between a retreated position away from the lower wire guide and a constraining position which is close, right above the lower wire guide, to the top surface of the cut-out piece, for preventing the cut-out piece from being upwardly detached from the workpiece. Preferably, a nozzle mounted on the electric discharge machine for upwardly jetting machining fluid toward the workpiece is used as the fluid jetting means; a table mounted on the electric discharge machine for horizontally moving the workpiece is used as the drive means; and a control unit mounted on the electric discharge machine for controlling operations of the electric discharge machine is used as the control means.

As described above, according to the present invention, the fluid is jetted upwardly toward the bottom surface of a cut-out piece to thereby retain the cut-out piece in the workpiece, and the cut-out piece is horizontally moved in unison with the workpiece. Thus, the piece drops off the workpiece when the cut-out piece reaches a position, horizontally away from the lower wire guide, where an upward force produced by the jetted fluid no longer acts upon the piece. This allows the piece to be easily removed from the workpiece simply by horizontally moving the cut-out piece while jetting the fluid. In addition, since the piece is held in the workpiece away from the lower wire guide by means of the jetted fluid during the travel of the cut-out piece, there is no contact between the cut-out piece and the lower wire guide, thus causing no damage to the piece or the guide due to contacting. Unlike the prior art in which a supporting plate is employed, the cut-out piece is supported by the jetted fluid, so that there is no chance of damage to the cut-out piece during the travel of the cut-out piece or of undue load applied to the main body of the electric discharge machine. Since the piece is completely cut out of the workpiece before the cut-out piece is removed from the workpiece, there is no need to tap the cut-out piece off, allowing cut-out pieces of various dimensions to be removed without failure. Unlike the prior art which uses electromagnetic suction means, the present invention can be also applied to cut-out pieces made of non-magnetic materials. Further, unlike the prior art of a pressure-reduction type, the prevent invention is capable of reliably removing cut-out pieces of various shapes, including pieces with rugged top surfaces. In contrast to the pressure-reduction type prior art which requires a pressure reducing device and piping, the present invention can be implemented using an arrangement with a simple configuration, and there is no need to move a suction means in synchronization with workpiece movement. To implement the present invention, for instance, a machining fluid jetting nozzle, a worktable, and a control unit of an electric discharge machine can be utilized, which are originally used for electric discharge machining.

BEST MODE OF CARRYING OUT OF THE INVENTION

Figure 1:
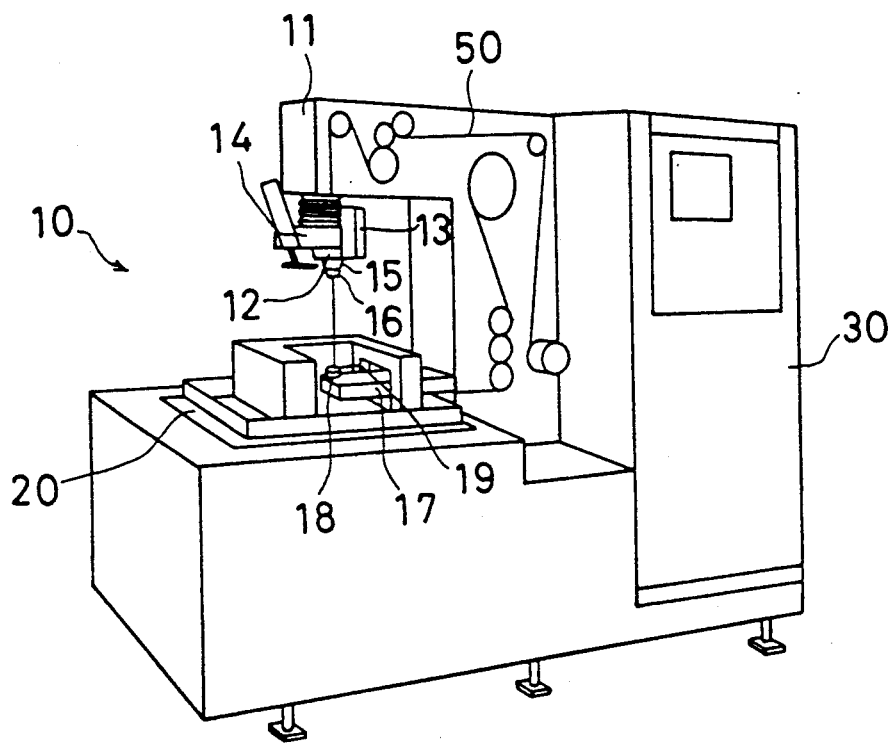
FIG. 1 is a schematic perspective view showing a wire-cut electric discharge machine provided with a cut-out piece removing apparatus according to an embodiment of the present invention.
Figure 2:
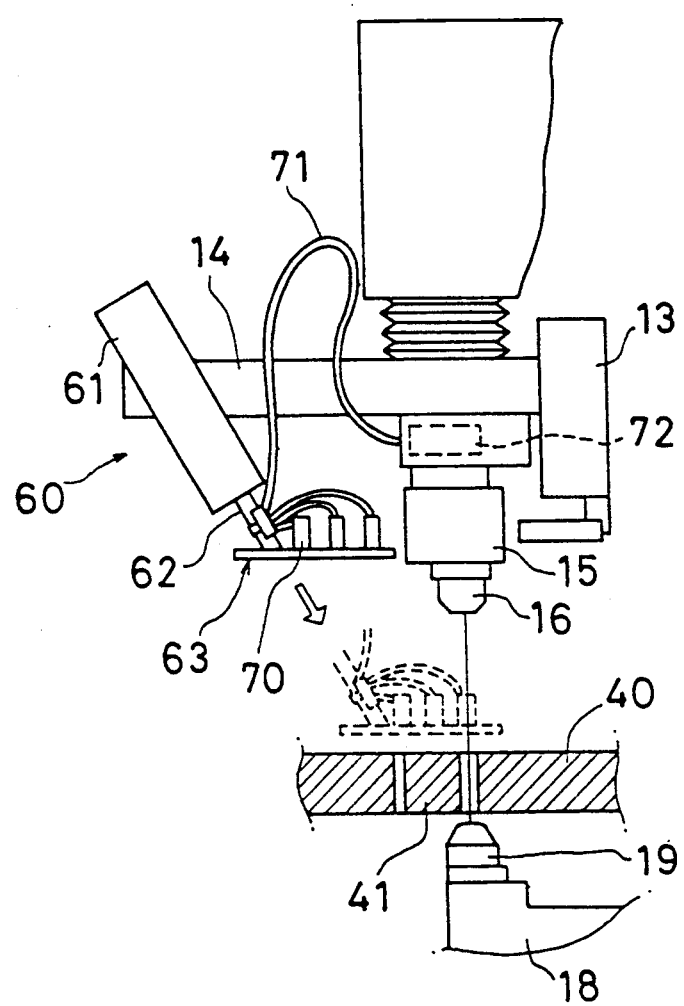
FIG. 2 is a fragmentary front view showing, partly in cross section, a cylinder-piston assembly, a constraining assembly, and a machining fluid jetting nozzle for cut-out piece removal which are provided in the cut-out piece removing apparatus, together with their peripheral elements.

Referring to FIGS. 1 and 2, the wire-cut electric discharge machine is provided with a machine main body 10 which is basically constructed in a known manner, and a numerical control unit 30 for controlling operations of various sections of the machine main body 10 in accordance with a program stored beforehand in a computer memory.

The machine main body 10 includes a Z-axis unit 12 vertically movable relative to an upper column 11 of the main body, an automatic wire extension unit 13 fixed to the Z-axis unit 12 via a stay 14 and having a wire cutting function, an upper wire guide 15 having an upper nozzle 16 and mounted to the Z-axis unit 12, and a lower wire guide 18 having a lower nozzle 19 facing the upper nozzle 16 and mounted to the distal end of a lower arm 17. Preferably, the upper wire guide 15 is arranged to be vertically movable in unison with the Z-axis unit 12 and horizontally movable relative to the unit 12. The upper nozzle 16 and the lower nozzles 19 are respectively connected to a machining fluid supply system (not illustrated) of the machine main body 10, and are each designed to jet the machining fluid toward a workpiece 40 when an associated one of solenoid valves in the machining fluid supply system are opened. A table 20 of the machine main body 10, on which the workpiece 40 is mounted, is operatively coupled to an X-axis and Y-axis motors (not shown).

In the machine main body 10 which operates under the control of the numerical control unit 30, a wire electrode 50 passing through the workpiece 40 is delivered by a wire delivery unit (not shown) from the upper wire guide 15 to the lower wire guide 18, and the table 20 is driven by the X-axis and Y-axis motors, so that the workpiece 40 mounted on the table 20 is moved along a specified machining track on the XY plane. During that time, a machining voltage is applied from a machining power source (not shown) to a machining gap between the workpiece 40 and the wire electrode 50 to thereby perform electric discharge machining, while the machining fluid is jetted form the upper nozzle 16 and the lower nozzle 19 to the gap, whereby a plurality of pieces (products or cores) 41 are cut out in succession from the workpiece 40, for example.

Next, an apparatus, which constitutes the principal part of the present invention, for removing the cut-out pieces 41 from the workpiece 40 each time cutting-out machining of one of the pieces 41 is finished, will be explained.

This cut-out piece removing apparatus has a first fluid jetting means for upwardly jetting the fluid toward the bottom surface of the cut-out piece 41, a drive means for horizontally moving the cut-out piece 41 in unison with the workpiece 40, and a control means for controlling the operation of these two means. To simplify its configuration, the cut-out piece removing apparatus, according to an embodiment of the present invention, utilizes the lower nozzle 19 and the table 20 of the machine main body 10 and the numerical control unit 30, as the first fluid jetting means, the drive means, and the control means, respectively.

Figure 3:
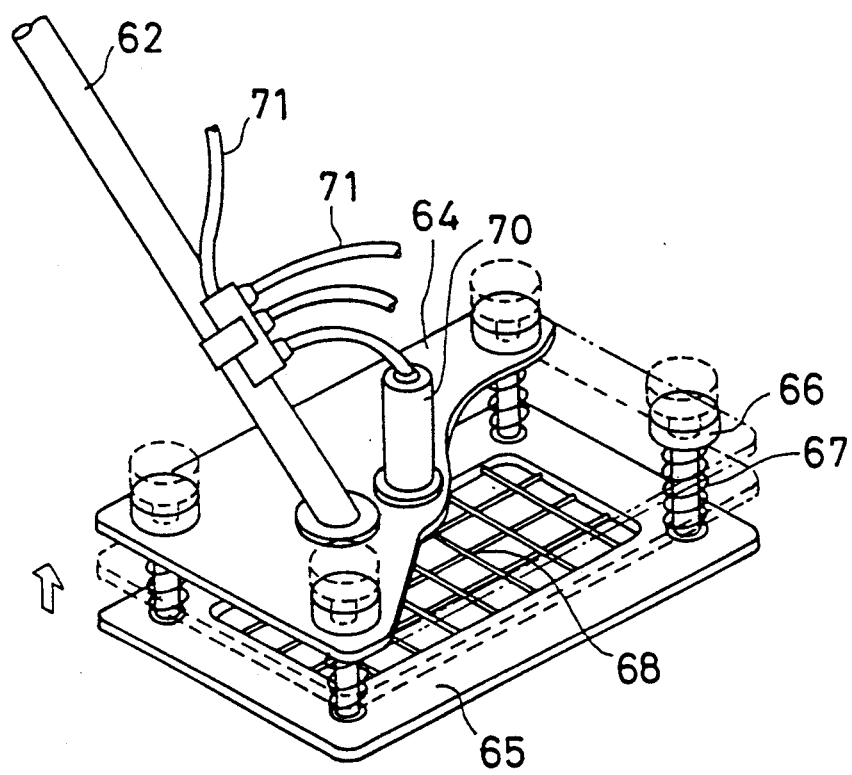
FIG. 3 is a fragmentary enlarged perspective view showing the constraining assembly and the nozzle shown in FIG. 2, together with a piston.

The cut-out piece removing apparatus further includes a constraining means for preventing the cut-out piece 41 from being upwardly removed from the workpiece 40 by an upward acting force of the jetted fluid, the constraining means including a cylinder-piston assembly 60 and a constraining assembly 63. As shown in FIGS. 2 and 3, the cylinder-piston assembly 60 includes an air cylinder 61 fixed to one end of the stay 14 which in turn fixed to the Z-axis unit 12, and slantingly and downwardly extending from the stay end toward the lower wire guide 18, and a piston 62 disposed in the cylinder 61 for advancing and retreating motion. This cylinder 61 has first and second cylinder chambers (not shown). The constraining assembly 63 extending horizontally is fixed to the distal end of the piston 62. The piston 62 is arranged to advance slantingly and downwardly when pressurized air is supplied to the first cylinder chamber of the cylinder 61 from a pressurized air source (not shown) through a first solenoid valve (not shown) which is controlled by the control unit 30, and retreat slantingly and upwardly when pressurized air is supplied to the second cylinder chamber through a second solenoid valve (not shown). As the piston 62 advances or retreats, the constraining assembly 63 is moved between a retreated position (shown by the solid line in FIG. 2) away from the lower wire guide 18 and a constraining position (shown by the dotted line) which is close, at right above the guide 18, to the top surface of the piece 41 with a gap of, e.g., approximately 1 mm.

The constraining assembly 63 has a square plate 64 fixed at its one end portion to the distal end of the piston 62 and extending horizontally, and a square frame 65 disposed thereunder. The frame 65 is mounted, through guide rods 66 and springs 67 fitted on those rods, to the plate 64 for movement toward or away from the plate. The frame 65 has a net 68 made of stainless wire. The bottom surface of the frame 65 is covered with a synthetic resin sheet (not shown).

The cut-out piece removing apparatus further includes three auxiliary nozzles (second fluid jetting means) 70 for downwardly jetting the fluid toward the top surface of the piece 41 to cause the cut-out piece 41 to be detached from the workpiece 40. Each of the auxiliary nozzles 70 is fixed to the plate 64 of the constraining assembly 63, and is connected to the machining fluid supply system of the machine main body 10 via a tube 71 provided at its middle with a solenoid 72 which operates under the control of the numerical control unit 30.

In the following, a cut-out piece removing operation of the electric discharge machine will be explained.

Upon completion of cutting-out machining for one of the pieces 41, the supply of the machining fluid to the upper and lower nozzles 16 and 19 is interrupted, the wire 50 is cut by the automatic wire extension unit 13, and then the Z-axis unit 12 is moved upward to the retreated position. At the end of the cutting-out machining, the cut-out piece 41 separated from the workpiece 40 rests on the lower nozzle 19 in a manner slightly inclined in the workpiece (the degree of inclination of the piece 41 is emphasized).

Figure 4A:
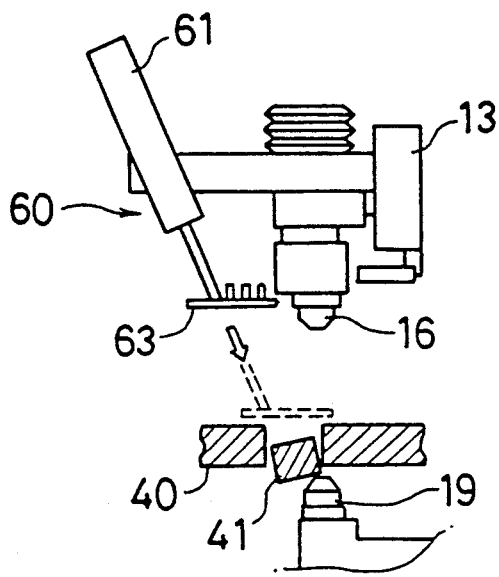
FIGS. 4A-4C are schematic diagrams illustrating the operation of the cut-out piece removing apparatus.
Figure 4B:
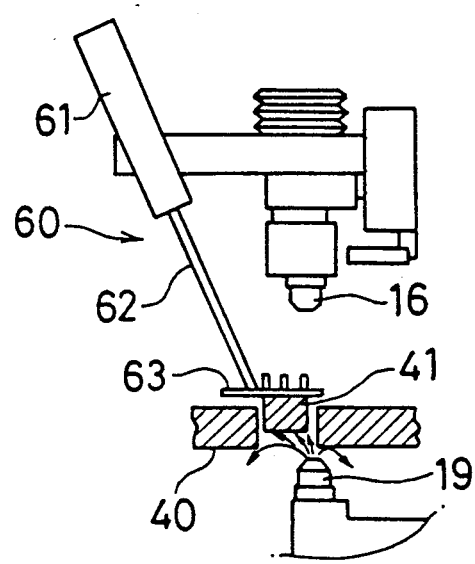

When the Z-axis unit 12 reaches the retreated position, the first solenoid valve associated with the cylinder 61 is opened under the control of the control unit 30, which functions as the control means of the cut-out piece removing apparatus, so that pressurized air is supplied to the first cylinder chamber of the cylinder 61 to cause the piston 62 to advance. Thereafter, when the constraining assembly 63 moves from the retreated position shown by the solid line in FIG. 4A to the constraining position shown by the dotted line in FIG. 4A, the supply of the pressurized air is cut off, causing the assembly 63 to be retained in the constraining position. As a result, the net 68 of this assembly is disposed at a location close to the top surfaces of the workpiece 40 and the cut-out piece 41. Then, the machining fluid at approximately 15 atmospheres is jetted upwardly from the lower nozzle 19, which functions as the first fluid jetting means, toward the bottom surface of the cut-out piece 41. As shown in FIG. 4B, the cut-out piece 41, which receives at its bottom surface with an upwardly acting force, is urged upward and is moved in the upward direction away from the lower nozzle 19. The piece is prohibited from being upwardly detached from the workpiece 40 because of the presence of the net 68 located near the top surface of the piece. When the cut-out piece 41 collides with the net 68, the net 68 moves up to absorb an impact force. As a result, the cut-out piece 41 is retained in the workpiece 40 in a state away from the lower nozzle 19, and the machining fluid fills the gap between the bottom surface of the piece and the lower nozzle 19.

Then, the table 20 is moved in the horizontal direction, so that the cut-out piece 41 is moved together with the workpiece 40 in the horizontal direction away from the lower nozzle 19, with the lower nozzle 19 jetting the machining fluid. During that time, the cut-out piece 41 and the lower nozzle 19 are kept out of contact from each other by the machining fluid jet, whereby the cut-out piece 41 smoothly moves horizontally along the net 68 in the direction opposite from the lower nozzle while keeping in contact with or away from the net 68.

Figure 4C:
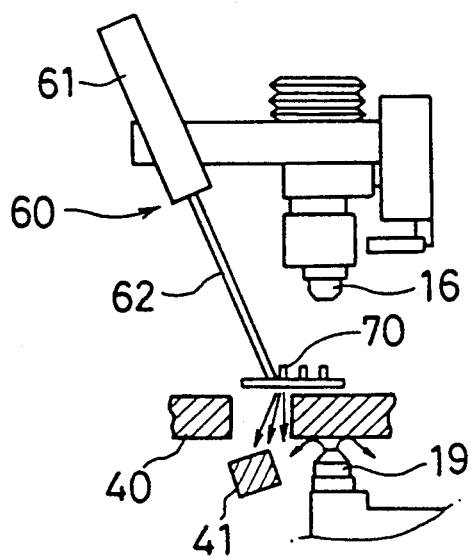

Subsequently, when the table 20 is horizontally moved over a predetermined amount of table movement (30 to 60 mm), which corresponds to a predetermined piece moved position where the machining fluid jet normally no longer acts on the bottom surface of the cut-out piece and which was experimentally predetermined, the table movement is stopped. In addition, the solenoid valve 72 associated with the auxiliary nozzles 70 is opened, so that the machining fluid is jetted downward from the auxiliary nozzles 70 toward the top surface of the cut-out piece 41, as shown in FIG. 4C. As a result, the cut-out piece 41 is forcibly dropped from the workpiece, being subjected to the downward machining fluid jet at the table stop position where the upward working force of the machining fluid jet is normally rendered substantially ineffective, and hence the natural falling of the piece from the workpiece is normally permitted. Next, the solenoids respectively associated with the auxiliary nozzles 70 and the lower nozzle 19 are closed, to thereby stop the supply of the machining fluid jet from those nozzles. Further, the second solenoid associated with the cylinder 61 is opened to supply the pressurized air to the second cylinder chamber of the cylinder 61, causing the piston 62 to retreat. When the constraining assembly 63 moves from the constraining position to the retreated position, the pressurized air supply is cut off so that the assembly 63 is retained in the retreated position, whereby the cut-out piece removing operation is completed. Whereupon, the table 20 is positioned in the start position for the cutting-out machining of the next piece, and then the automatic wire extension is performed.

The present invention is not limited to the aforementioned embodiment, and various modifications thereof may be made.

For instance, in the embodiment, the cylinder-piston assembly 60 slantingly mounted is used as part of the constraining means for preventing the cut-out piece 41 from being upwardly detached from the workpiece 40 by the upward machining fluid jet. Alternatively, a similar cylinder-piston assembly may be installed vertically, and its piston may be rotatively driven by a motor. In this case, the piston is moved downward until the constraining assembly mounted on the distal end of the piston reaches the height slightly above the top surface of the cut-out piece, and then the piston is turned until the constraining assembly reaches the location right above the top surface of the cut-out piece.

In stead of the aforementioned vertical cylinder-piston assembly, an assembly rotary mechanism consisting of a rotary shaft mounted at its distal end with the constraining assembly, and a supporting section fixed to the Z-axis unit and supporting the rotary shaft may be used. In this case, the Z-axis unit is moved down in place of the piston.

The constraining means comprised of the cylinder-piston assembly 60 and the like is not an essential element of the present invention. In case that no constraining means is provided, the discharge pressure of the machining fluid jetted from the lower nozzle 19 is so adjusted that the pressure falls within an appropriate range.

In the aforesaid embodiment, to simplify the configuration of the apparatus, the lower nozzle 19, the table 20 and the numerical control unit 30, which are originally used for electric discharge machining, are respectively employed as the first fluid jetting means, the cut-out piece drive means and the control means for the cut-out piece removal operation effected after the electric discharge machining. However, these means may be provided separately. The first fluid jetting means, in particular, may be provided independently of the lower nozzle 19. In this case, the first fluid jetting means may be arranged to be movable, so as to cause a cut-out piece to drop at a farther point from the lower nozzle. Although the machining fluid is used, in the embodiment, as the fluid for cut-out piece removal, various other types of liquids or gases such as pressurized air may be used instead.

We claim:

1. A cut-out piece removing method in electric discharge machining in which a piece is cut out from a workpiece, comprising the steps of:
    (a) upwardly jetting fluid toward a bottom surface of the piece cut out of the workpiece; and
    (b) horizontally moving the cut-out piece in unison with the workpiece while jetting the fluid;
    wherein the cut-out piece is permitted to naturally drop from the workpiece when the cut-out piece reaches a horizontal moved position at which the jetted fluid no longer acts thereon.

2. The cut-out piece removing method according to claim 1, further including the step of:
    downwardly jetting the fluid toward a top surface of the cut-out piece when the cut-out piece reaches the horizontal moved position at which the jetted fluid no longer acts thereon.

3. The cut-out piece removing method according to claim 1, wherein said method is applied to an electric discharge machine having a nozzle for upwardly jetting machining fluid toward the workpiece, and a table for horizontally moving the workpiece; and
    wherein the jetting of the fluid in said step (a) is performed by means of said nozzle, and the movement of the cut-out piece in said step (b) is performed by means of said table when the piece has been cut out of the workpiece.

4. A cut-out piece removing apparatus for use in a wire-cut electric discharge machine in which a piece is cut out from a workpiece, comprising:
    fluid jetting means for upwardly jetting fluid toward a bottom surface of the piece cut out from the workpiece;
    drive means for horizontally moving the cut-out piece in unison with the workpiece; and
    control means for controlling operations of said fluid jetting means and said drive means upon completion of cutting out of the piece from the workpiece, such that said cut-out piece is permitted to drop naturally from the workpiece when the cut-out piece reaches a horizontal moved position at which the jetted fluid no longer acts thereon.

5. The cut-out piece removing apparatus according to claim 4, wherein said apparatus is mounted on an electric discharge machine having a lower wire guide, said apparatus further including:
    second fluid jetting means for downwardly jetting the fluid toward a top surface of the cut-out piece at a location horizontally away from said lower wire guide, under the control of said control means.

6. The cut-out piece removing apparatus according to claim 4, further including:
    constraining means, having a constraining member which is movable between a retreated position away from a lower wire guide and a constraining position close, right above the lower wire guide, to the top surface of the cut-out piece, for preventing the cut-out piece from being upwardly detached from the workpiece.

7. The cut-out piece removing apparatus according to claim 4, wherein a nozzle mounted on an electric discharge machine for upwardly jetting machining fluid toward the workpiece is used as said fluid jetting means; a table mounted on the electric discharge machine for horizontally moving the workpiece is used as said drive means; and a control unit mounted on the electric discharge machine for controlling operations of the electric discharge machine is used as said control means.

* * * * *